United States Patent [19]

Lunn

[11] 4,399,432

[45] Aug. 16, 1983

[54] AUDIO SIGNALING DEVICE AND METHOD

[76] Inventor: David J. Lunn, 24350 Falcon Ave., Forest Lake, Minn. 55025

[21] Appl. No.: 236,256

[22] Filed: Feb. 20, 1981

[51] Int. Cl.³ .............................................. G08B 21/00
[52] U.S. Cl. ...................................... 340/573; 119/29
[58] Field of Search ........................... 340/573; 119/29

[56] References Cited

U.S. PATENT DOCUMENTS

| | | | |
|---|---|---|---|
| 2,800,104 | 7/1957 | Cameron et al. | 119/29 |
| 3,163,856 | 12/1964 | Kirby | 340/279 |
| 3,277,465 | 10/1966 | Potter | 340/384 |
| 3,331,970 | 7/1967 | Dundon et al. | 310/9.1 |
| 3,336,530 | 8/1967 | Sloan et al. | 325/29 |
| 3,589,337 | 6/1971 | Doss | 119/29 |
| 3,710,371 | 1/1973 | Whalen et al. | 340/283 |
| 3,790,948 | 2/1974 | Ratkovich | 343/113 |
| 3,972,038 | 7/1976 | Fletcher et al. | 340/189 |
| 3,980,051 | 9/1976 | Fury | 119/29 |
| 4,202,293 | 5/1980 | Gonda et al. | 119/29 |
| 4,234,876 | 11/1980 | Murai | 340/573 |
| 4,325,060 | 4/1982 | Purtell et al. | 340/693 |

Primary Examiner—Glen R. Swann, III
Attorney, Agent, or Firm—Burd, Bartz & Gutenkauf

[57] ABSTRACT

An audio signal device is used as an aid in locating a hunting dog and providing audio information as to whether the dog is moving, or is stationary. The signal device has an audio signal generator or beeper unit connected to electronic circuitry, an on-off switch, and a battery. The electronic circuitry has mercury switches responsive to movement of the dog to supply the signal generator with power so as to produce a first output sound. The electronic circuitry functions to energize the signal generator to produce different audio signals when the dog is moving, or is stationary. When the dog stops moving, the electronic circuitry withholds electric power from the signal generator for a limited period of time to allow the dog to locate the handler or receive instructions. Thereafter, with the dog stationary, the signal generator is energized to produce a second output sound that is different from the first output sound.

28 Claims, 7 Drawing Figures

U.S. Patent  Aug. 16, 1983  4,399,432
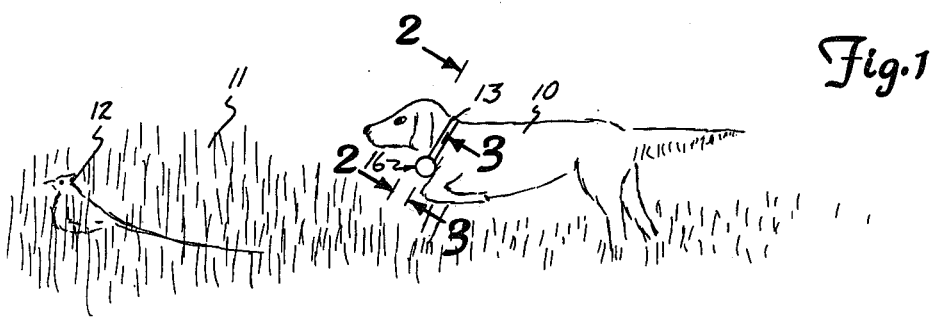
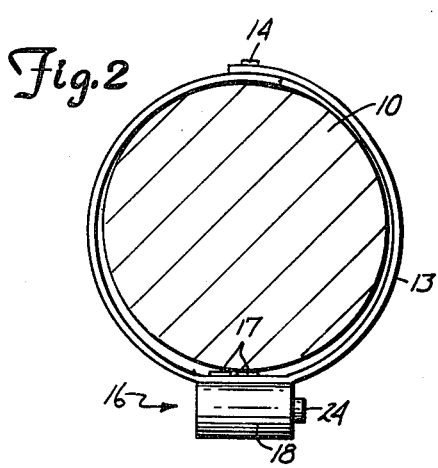
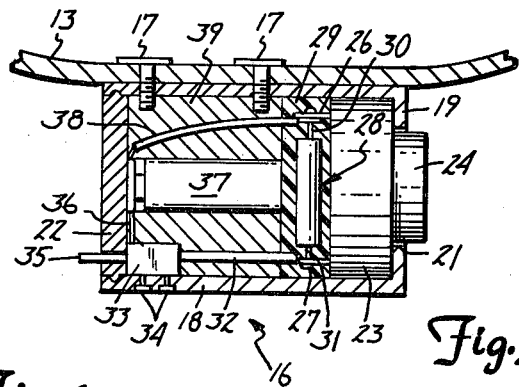
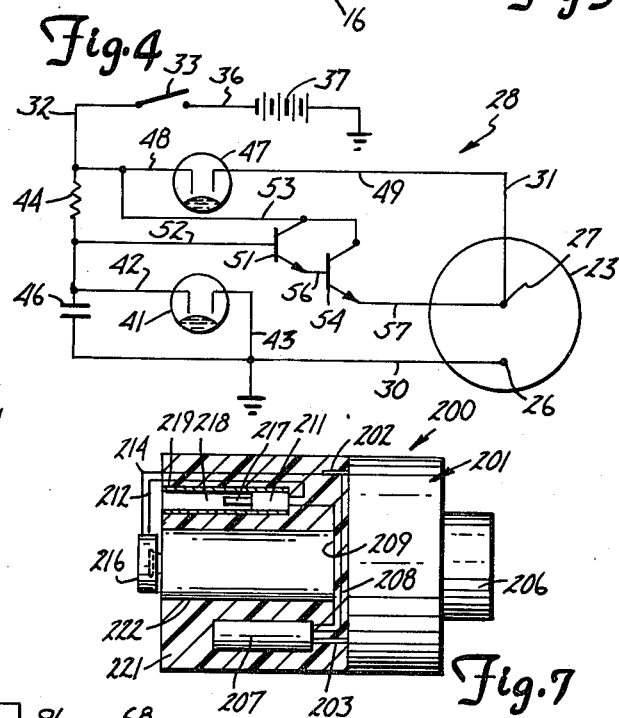
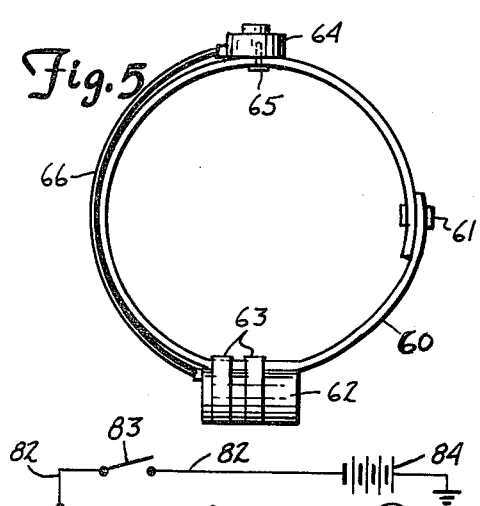
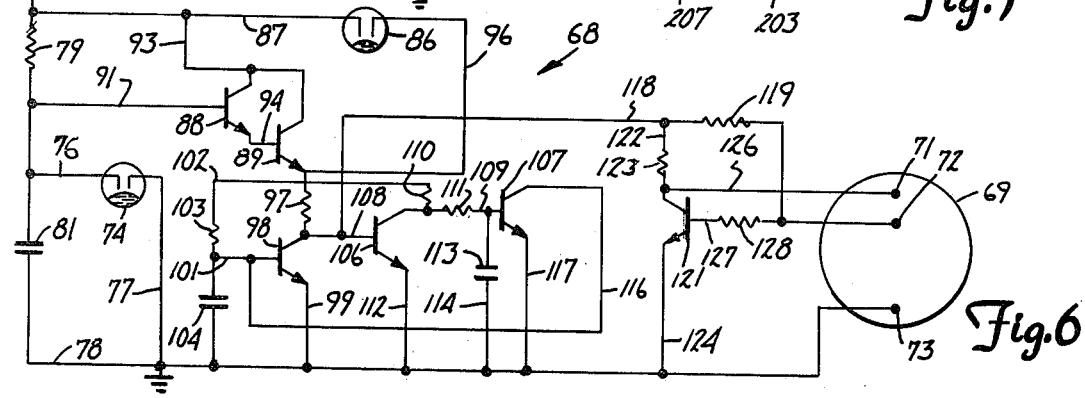

AUDIO SIGNALING DEVICE AND METHOD

BACKGROUND OF INVENTION

Hunting or bird dogs are trained to locate game birds, as pheasants, partridges, and grouse, in the outside environment or field. The field usually has irregular terrian and vegetation, such as brush, grass, or cultivated crops, as corn. The terrain and vegetation can obscure the dog, preventing visual contact by the dog handler or the hunter. The hunter will signal the dog to return to a location where the dog can be observed. Occasionally, the hunter spends considerable time locating the dog. Bells and signaling devices have been mounted on dog collars to provide an audio signal providing the hunter with information as to the location of the dog. These signaling devices generate the same signals when the dog is moving or is stationary, or no signal when the dog is stationary. A stationary dog, such as a dog on point, cannot be located with silent signaling devices.

SUMMARY OF INVENTION

The invention is directed to an audio signal device carried by the collar of a hunting dog to provide a first audio signal when the dog is moving and a second audio signal when the dog is stationary. The first and second signals are different distinguishable sounds used as an aid in locating the dog and provide information as to whether the dog is moving or stationary. The audio signal device has an audio indicator electrically coupled to electronic circuitry operable to energize the audio indicator to produce the audio signals. When the dog stops moving, the electronic circuitry withholds electric power from the audio indicator for a variable period of time; for example, five seconds, to provide a silent period to allow the dog and handler to coordinate instructions.

The audible sound is produced by an electrically operated audio indicator means having means, such as a piezo-electric transducer operable to provide accoustic energy within the frequency range of the human ear. The electronic circuitry is electrically connected to the audio indicator means to drive the audio indicator means so as to produce an audible sound. An electric power source, such as a battery, is connected to the electric circuit means through an on-off switch means. The on-off switch means is manually operated to complete the electric circuit connecting the power source and the circuit means. Support means, such as a casing or encapsulating plastic body, is used to contain the circuit means, power source, and switch means. In one embodiment, the switch means is located within a tube encapsulated in a plastic body. The tube has an open end providing access to an actuator for the switch means allowing the switch means to be manually operated. The plastic body has a central cavity to accommodate a battery power source. The electronic circuitry has means responsive to movement of the dog to provide electric power to the audio indicator means whereby the audio indicator means produces first audio signals providing the handler with audio information that the dog is moving. The means of the electronic circuitry is also responsive to a stationary condition of the dog to withhold the electric power to the audio indicator means for a limited period of time making the audio signal device inoperative. The electronic circuitry then is operative to provide electric power to the audio indicator means whereby the audio indicator means produces a second audio signal, such as intermittent sound signals, have an initially reduced volume and different rate than the first sound signals so that they are readily discernible by the handler indicating the stationary or point condition of the dog.

The electronic circuitry utilizes a pair of mercury switches connected to provide or withhold power to the audio indicator when the dog is moving. Transistor means are used to energize the audio indicator means when the dog is stationary. A time delay resistor capacitor arrangement holds the base voltage of the transistor means below the turn-on point for a predetermined period of time to withhold power to the audio indicator means thereby providing a limited silent period as soon as the dog stops. This allows the dog and handler to coordinate their activities. The silence is also a signal to the handler that the dog has stopped and may be on point.

The audio signal device is light in weight, sturdy in construction, and durable in use. A casing or body is used to support and protect the electronic circuitry, on-off switch, and the power source. The casing, being mounted on the dog collar, does not interfere with or inhibit the activities of the dog. The on-off switch is manually operated, allowing the handler to turn off the audio signal device without removing the device from the dog. The power source, such as a battery, can be conveniently removed from the audio signal device and replaced with a new power source. These and other objects and advantages of the audio signaling device are set out in the audio signal devices hereinafter described.

IN THE DRAWINGS

FIG. 1 is a perspective view of a dog provided with a collar carrying the audio signal device of the invention;

FIG. 2 is an enlarged sectional view taken along the line 2—2 of FIG. 1 of the collar and audio signal device;

FIG. 3 is an enlarged sectional view taken along the line 3—3 of FIG. 1;

FIG. 4 is a circuit diagram of the audio signal device;

FIG. 5 is a view similar to FIG. 2 of a modification of the audio signal device;

FIG. 6 is a modified circuit diagram of the audio signal device; and

FIG. 7 is a sectional view similar to FIG. 3 of a modification of the audio signal device of the invention.

DESCRIPTION OF PREFERRED EMBODIMENTS

Referring to FIG. 1, there is shown a hunting dog or bird dog 10 in a field 11 providing an environment for one or more birds 12, such as a pheasant, partridge, grouse, and the like. A conventional dog collar 13 is located around the neck of dog 10. As shown in FIG. 2, a releasable connector 14, such as a buckle, snap, or pin, retains collar 13 about the dog's neck. An audio signal device indicated generally at 16 is secured to a lower portion of collar 13 with a plurality of fasteners 17. Fasteners 17 are shown as short flat-headed bolts. Other fastening means, such as bands, cables, ties, tape, screws, and rivets, can be used to attach audio signal device 16 to collar 13.

As shown in FIG. 3, audio signal device 16 has a cylindrical casing or body 18 having an open end and a closed end wall 19. End wall 19 has a central circular opening 21. A cap or disc 22 is snapped into the open end of casing 18. An audio signal generator or beeper unit 23 is located in casing 18 adjacent wall 19. Signal generator or audio indicator unit 23 has a cylindrical horn or projection 24 that fits through the opening 21. Preferably, signal generator 23 has an audio frequency of 1000 to 3000 cycles per second. Other audio frequencies can be used. The sound frequency range is within the sound range detectable by the human ear. Signal generator 23 is a commercial unit constructed according to the audible alarms disclosed in U.S. Pat. Nos. 3,277,465 and 3,331,970. The subject matter of these patents is incorporated herein. The signal generator has a piezo-electric transducer that is electrically driven to produce an audible sound.

Signal generator 23 has a pair of electrical terminals 26 and 27 connected to electronic circuitry or circuit means indicated generally at 28. Electronic circuitry 28 is connected with a ground line 30 to terminal 26 and an output signal line 31 to terminal 27. The electronic circuitry 28, lines 30 and 31, and terminals 26 and 27 are encapsulated in a plastic body 29. Plastic body 29 is a plug that protects and retains signal generator 23 in engagement with casing end wall 19.

An input power line 32 connects terminal 27 to an on-off switch 33. A screw 34 secures switch 33 to casing 18. Additional screws or fasteners can be used to retain or anchor switch 33 on casing 18 or cap 22. Switch 33 can be secured to body 29. Switch 33 has an actuator or button 35 that is manually moved to turn the switch on and off. Actuator 35 projects through a hole in cap 22 so that the outer end thereof can be pressed with the fingers of the hunter or dog handler. A line 36 connects switch 34 to a battery 37, such as a 9-volt D.C. battery. A ground line 38 connects battery 37 to terminal 26. The battery 37 is located within casing 18 and is surrounded with a padding 39, such as fibers or foam plastic. Cap 22 can be removed from casing 18 to allow replacement of battery 37. This is accomplished by snapping cap 22 off of casing 18 and removing lines 36 and 38 from the battery terminal. After the battery has been replaced, cap 22 is snapped back into the open end of casing 18.

Referring to FIG. 4, electronic circuitry 28 controls the power supplied to signal generator 23. Electronic circuitry 28 has a first mercury switch 41 connected with line 42 to a power input line 32 and line 43 to ground line 30. Switch 41 is normally open when the audio signal device 16 is in its normal horizontal position. When dog 10 walks or runs, the mercury in switch 41 moves to intermittently make and break electrical contact whereby switch 41 is intermittently on and off. Mercury switch 41 is a dog motion detection switch. A series connected resistor 44 and capacitor 46 are located in power line 32. Line 42 is connected between resistor 44 and capacitor 46. A second mercury switch 47 is connected with line 48 to power line 32 and line 49 to terminal line 31. Switch 47 is normally off when the audio signal device is in its horizontal position and the dog is stationary. When dog 10 moves, the mercury in switch 47 causes the switch 47 to complete the circuit to signal generator 23. Mercury switch 47 is a motion detector. Mercury switch 41 functions to discharge capacitor 46. The time delay, resistor 44-capacitor 46, provides for delaying application of voltage to signal generator 2, causing an inactive or silent period.

A first transistor 51 and second transistor 54 are operable to provide the current requirements for signal generator 23. A line 52 connects the base of transistor 51 to the power line 32. A line 53 connects the collector of transistor 51 to line 48. The emitter of transistor 51 is connected with a line 56 to the base of transistor 54. Line 53 is also connected to the collector of transistor 54. The emitter of transistor 54 is connected to a line 57 joined to terminal 27 of signal generator 23.

Referring to FIG. 5, there is shown a modification of the audio signal device. The audio signal device is mounted on an animal or dog collar 60 having a releasable connector 61, such as a pin, buckle, clasp, or the like. A cylindrical casing or body 62 is connected to a lower portion of collar 60 with a plurality of bands 63. Casing 62 houses the electronic circuitry 28 and battery 37. An audio signal generator or beeper unit 64 is secured by fasteners, such as bolts or screws 65 to the top of collar 60. A cable or line 66 connects the electronic circuitry 28 in casing 62 to signal generator 64. A switch (not shown) is used to disconnect the electronic circuitry and signal generator from the battery.

Referring to FIG. 6, there is shown a modification of the audio signal device indicated generally at 68. The device has electronic circuitry which operates the piezo-ceramic beeper buzzer unit 69. Buzzer unit 69 is a commercial unit having a piezo-ceramic transducer electrically energized to produce an audio signal or sound. Buzzer unit 69 has three terminals 71, 72, and 73 that are coupled to the electronic circuitry. Terminal 71 is connected to the drive line 126. Terminal 72 is connected to a feedback line 127. Terminal 73 is connected to common or ground line 78. The circuitry includes a mercury switch 74 connected with a line 76 to a power line 82. A second line 77 connects mercury switch 74 to ground line 78. A resistor 79 and capacitor 81 are connected in series to power line 82. Power line 82 is connected via an on-off switch 83 to a power source 84, such as a 9-volt battery.

The electronic circuitry includes a second mercury switch 86 connected with line 87 to power line 82. A pair of transistors 88 and 89 are located in parallel with mercury switch 86. A line 91 connects the base of the transistor 88 to power line 82 between transistor 79 and capacitor 81. Line 93 connects the collectors of transistors 88 and 89 to line 87. The emitter of transistor 88 is connected with line 94 to the base of transistor 89. A line 96 connects the mercury switch 86 to the emitter of the transistor 89 which is connected via a resistor 97 to the collector of a transistor 98. The emitter of transistor 98 is connected with a line 99 to ground line 78. The base of transistor 98 is connected with a line 101 to a line 102. A resistor 103 and capacitor 104 are coupled to line 102. Capacitor 104 is also connected to ground line 78. Transistors 106 and 107 are connected in the circuit with transistor 98. The collector of transistor 98 is connected with a line 108 to the base of transistor 106. The collector of transistor 106 is connected with a line 109 to the base of transistor 107. A resistor 111 is interposed in line 109. Line 102, having a resistor 110, is connected to line 109. The emitter of transistor 106 is connected with line 112 to ground line 78.

A capacitor 113 located in line 114 is connected to line 109 and ground line 78. The collector of transistor 107 is connected to line 116 which leads to line 101. The emitter of transistor 107 is connected with a line 117 to ground line 78.

A line 118 is connected to line 108 and a resistor 119 which in turn is connected to the beeper unit terminal 72. Another transistor 121 is connected with a line 122 having a resistor 123 to the line 118. A line 124 connects the emitter of transistor 121 to ground line 78. Line 122 is connected with line 126 to a terminal 71 of beeper unit 69. The base of transistor 121 is connected with a line 127 having a resistor 128 to the terminal 72. Resistors 123, 119, and 128 and transistor 121 provide the drive and feed-back circuits to operate the piezo-ceramic beeper buzzer unit 69. The circuitry consisting of the resistors 103, 97, 110, and 111, capacitors 104 and 113, and transistors 98, 106, and 107 provide an oscillator with a component value chosen to provide an output having a nominal period of one second and a 50 percent duty cycle. This circuitry provides the characteristic pulsing tone output of a device when signal generator units, other than a Mallory pulsed signal generator unit, are used.

Referring to FIG. 7, there is shown a modification of the audio signal device, indicated generally at 200. Audio signal device 200 has an audio signal generator or beeper unit 201 having terminals 202 and 203. Beeper unit 201 has a cylindrical casing or housing 204 and a cylindrical projection or horn 206 attached to one side of the casing. Examples of beeper units are disclosed in U.S. Pat. Nos. 3,277,465 and 3,331,970. The subject matter of these Patents is incorporated herein. The beeper unit, when energized, produces an audible sound. Preferably, the frequency of the sound is about 1000 to 3000 cycles per second. Other frequencies can be used to provide the audio signals which inform the hunter of the location of the dog and indicate if the dog is moving or stationary.

Electronic circuitry 207 is connected to terminal 203 and a line 208 leading to terminal 202. The circuit diagram of electronic cicuitry 207 is shown in FIG. 4. A power input line 209 connects electronic circuitry 207 with an on-off switch 211. A line 212 connects switch 211 with one terminal of a battery 213, such as a Union Carbide No. 522 9-volt battery. The other terminal of battery 213 is connected to a line 214 joined to beeper unit terminal 202. A releasable cap or connector 216 connects lines 212 and 214 to the battery terminals.

Switch 211 has a movable actuator or button 217 located in a passage 218 of a tube 219. Passage 218 has an open end providing access to actuator 217 to linearly move the actuator thereby selectively turning the switch on and off. The actuator 217, being located in passage 218, is protected from damage and unwanted actuation.

The electronic circuitry 207, tube 219, and lines 208, 209, 212, and 214 are encapsulated with a cylindrical rigid plastic body 221. The plastic of body 221 is, preferably, a polyurethane encapsulating compound. Body 221 is bonded to casing 204 of beeper unit 201 whereby beeper unit 201 and body 221 comprise a one-piece structure. The center of body 221 has a rectangular cavity 222 accommodating battery 213. Cavity 222 has dimensions such that battery 213 has a tight or friction fit relative to body 221 so that in use battery 213 remains assembled with body 221. Battery 213 can be removed from cavity 222 and replaced with a new or recharged battery. Body 221 protects the battery 213, switch 211 and electronic circuitry from external objects, water, and impact damage.

In terms of a method of providing audio information to a dog handler or hunter as to the movement or stationary conditions of a dog, the audio signal device 16 operates to provide a first audio signal responsive to movement of the dog. The first signal informs the handler that the dog is moving. If the handler cannot visually observe the dog, the first signal will also provide the information as to the location of the dog in the field. This is done by ascertaining the signal direction. As soon as the dog stops or is in a stationary condition, the first audio signal is terminated for a limited period of time. This silences the audio signal device and enables the handler to instruct the dog.

A second audio signal is then provided in response to the stationary condition of the dog. This signal informs the handler that the dog is stationary and may be on point. This signal also provides information as to the location of the dog in the event that the dog is not within sight. The first and second signals are intermittent sounds having a frequency range that can be detected by the human ear. The first and second signals are distinguishable from each other, as they have different beats or rates. For example, the first audio signal can have a beat of 10 signals per second, while the second audio signal can have a beat of about 1 signal per second. The second signal starts at a reduced level and rises to the volume level of the first signal. The signals emanating from the audio signal device are ascertainable at a range from 0 to ½ mile maximum. The range of the audio signal device will vary in accordance with the background noise and the environmental conditions, as terrain and vegetation.

While there has been disclosed and described several audio signal devices for use with a hunting dog, it is understood that changes in the structure and circuits of the audio signal devices may be made by those skilled in the art without departing from the invention. Also, the audio signal device can be used with other animals to provide information as to the moving and stationary condition of the animals. The invention is defined in the following claims.

The embodiment of the invention in which an exclusive property or privilege is claimed are defined as follows:

1. An audio signal device carried by a dog operable to provide separate audio signals indicating to a dog handler movement of the dog and a stationary condition of the dog comprising: electrically operated audio signal generator means operable to produce a sound, electronic circuit means electrically connected to the signal generator means to drive the signal generator means whereby the signal generator means produces an audible sound, an electric power source, on-off switch means connected to the power source and the circuit means, said switch means when turned on electrically connecting the power source and circuit means, and means for supporting the circuit means, power source, and switch means, said means for supporting the circuit means, power source, and switch means comprising a body encapsulating the circuit means and attached to the signal generator means, said body having a cavity accommodating the power source, a tube located within said body, said switch means being located within said tube, said tube having an open end providing access to the switch means whereby the switch means can be selectively turned on and off, said circuit means having means responsive to movement of the dog to provide electric power to the signal generator means whereby the signal generator means produces first audio signals, said means of the electronic circuitry being responsive to a stationary condition of the dog to withhold electric power to the signal generator means for a limited period of time whereby the signal generator means does not produce audio signals and then provide electric power to the signal generator means whereby the signal generator means produces second audio signals, said second audio signals being different from the first audio signals whereby movement or stationary conditions of the dog can be ascertained by the dog handler.

2. The device of claim 1 wherein: the electric power source is a battery, and said means for supporting the circuit means, power source, and switch means has a chamber accommodating the battery.

3. An audio signal device carried by a dog operable to provide separate audio signals indicating to a dog handler movement of the dog and a stationary condition of the dog comprising: electrically operated audio signal generator means operable to produce a sound, electronic circuit means electrically connected to the signal generator means to drive the signal generator means whereby the signal generator means produces an audible sound, an electric power source, on-off switch means connected to the power source and the circuit means, said switch means when turned on electrically connecting the power source and circuit means, and means for supporting the circuit means, power source, and switch means, said circuit means having means responsive to the movement of the dog to provide electric power to the signal generator means whereby the signal generator means produces first audio signals, said means of the circuit means including a first mercury switch connected to the power source and signal generator operable to supply power to the signal generator in response to movement of the dog, said circuit means further including a capacitor, and a second mercury switch operable to discharge the capacitor in response to movement of the dog, said means of the electronic circuitry being responsive to a stationary condition of the dog to withhold electric power to the signal generator means for a limited period of time whereby the signal generator means does not produce audio signals and then provide electric power to the signal generator means whereby the signal generator means produces second audio signals, said second audio signals being different from the first audio signals whereby movement or stationary condition of the dog can be ascertained by the dog handler.

4. The device of claim 3 wherein: the means for supporting the circuit means, power source, and switch means is a casing having a chamber and an open end, and a cap releasably mounted on the open end to close said chamber, said circuit means, power source, and switch means being located in said chamber.

5. The device of claim 4 including: means located within said chamber encapsulating the circuit means.

6. The device of claim 3 wherein: the means for supporting the circuit means, power source, and switch means is a body encapsulating the circuit means and attached to the signal generator means, said body having a cavity accommodating the power source.

7. The device of claim 3 wherein: the circuit means includes transistor means coupled to the second switch operable to energize the signal generator when the dog is stationary.

8. A signal device carried by a dog operable to provide separate signals indicating to a dog handler movement of the dog and a stationary condition of the dog comprising: electrically operated signal generator means operable to produce signals to inform the handler of the moving and stationary condition of the dog, electronic circuit means electrically connected to the signal generator means to drive the signal generator means whereby the signal generator means produces a signal, an electric power source connected to the circuit means, and means for supporting the circuit means and power source, said circuit means having means including a first mercury switch connected to the power source and signal generator means responsive to movement of the dog to provide electric power to the signal generator means whereby the signal generator means produces a first signal, said means of the electronic circuitry being responsive to a stationary condition of the dog to withhold electric power to the signal generator means for a limited period of time whereby the signal generator does not produce a signal and then provide electric power to the signal generator means whereby the signal generator means produces a second signal, said second signal being different from the first signal whereby movement or stationary conditions of the dog can be ascertained by the dog handler.

9. The device of claim 8 wherein: the electric power source is a battery, and said means for supporting the circuit means and power source has a chamber accommodating the battery.

10. The device of claim 8 wherein: the means for supporting the circuit means and power source is a body encapsulating the circuit means and attached to the signal generator means, said body having a cavity accommodating the power source.

11. The device of claim 8 wherein: the circuit means includes a capacitor and a second switch operable to discharge the capacitor in response to movement of the dog.

12. The device of claim 8 wherein: the circuit means includes transistor means operable to energize the signal generator means when the dog is stationary.

13. A method of providing audio information to a dog handler as to the moving and stationary conditions of a dog comprising: providing a first audio signal in response to movement of the dog with an audio signal device carried by the dog that informs the handler that the dog is moving, terminating the first audio signal as soon as the dog is stationary, and providing a second audio signal in response to the stationary condition of the dog after a limited period of time has elapsed after termination of the first audio signal that informs the handler that the dog is stationary, said second audio signal initiates at a lower volume level than the first audio signal and slowly increases in volume to the level of the first audio signal.

14. The method of claim 13 wherein: said second signal is an intermittent sound that is distinguishable from the first audio signal.

15. The method of claim 13 wherein: the first audio signal is an intermittent sound, and said second audio signal is an intermittent sound having a rate that is regular and constant, and a period that is regular and constant.

16. The method of claim 13 wherein: the second audio signal is an intermittent sound having a beat of about one second intervals.

17. The method of claim 13 wherein: the second audio signal initiates at a lower volume level than the first audio signal and slowly increases in volume to the level of the first audio signal.

18. A method of providing audio information to a dog handler as to the moving and stationary conditions of a dog comprising: providing a first audio signal in response to movement of the dog with an audio signal device carried by the dog that informs the handler that the dog is moving, said first audio signal being an intermittent sound determined by motion of the dog, terminating the first audio signal as soon as the dog is stationary, providing a silent period of limited duration after termination of the first audio signal that informs the handler that the dog is stationary, and providing a second audio signal in response to the stationary condition of the dog after the silent period has lapsed that informs the handler that the dog is still stationary.

19. The method of claim 18 wherein: said second signal is an intermittent sound that is distinguishable from the first audio signal.

20. The method of claim 18 wherein: said second audio signal is an intermittent sound having a rate that is regular and constant, and a period that is regular and constant.

21. The method of claim 18 wherein: the second audio signal initiates at a lower volume level than the first audio signal and slowly increases in volume to the level of the first audio signal.

22. A signal device carried by a dog operable to provide separate signals indicating to a dog handler movement of the dog and a stationary condition of the dog comprising: electrically operated signaling means operable to produce signals to inform the handler of the moving and stationary conditions of the dog, electronic circuit means electrically connected to the signaling means to drive the signaling means whereby the signaling means produces a signal, an electric power source connected to the circuit means, and means for supporting the circuit means and power source, said circuit means having first motion detection switch means connected to the power source and signaling means responsive to movement of the dog to provide electric power to the signaling means whereby the signaling means produces a first signal, means for storing electrical power, and second motion actuated switch means operable to discharge the means for storing electrical power in response to movement of the dog, said means of the electronic circuitry being responsive to a stationary condition of the dog to withhold electric power to the signaling means for a limited period of time whereby the signaling means does not produce a signal resulting in a silent period and then produce electric power to the signaling means whereby the signaling means produces a second signal, said second signal being different from the first signal whereby movement or stationary conditions of the dog can be ascertained by the dog handler.

23. The device of claim 22 wherein: the first switch means is a first mercury switch and the second switch means is a second mercury switch, and said means for storing electrical power is a capacitor.

24. The device of claim 22 wherein: the circuit means includes transistor means operable to energize the signal generator means when the dog is stationary.

25. The device of claim 22 wherein: the electric power source is a battery, and said means for supporting the circuit means and power source has a chamber accommodating the battery.

26. The device of claim 22 wherein: the means for supporting the circuit means and power source is a body encapsulating the circuit means and attached to the signal generator means, said body having a cavity accommodating the power source.

27. The device of claim 22 wherein: the first signal is a first audio signal and the second signal is a second audio signal, said second audio signal initiates at a lower volume level than the first audio signal and slowly increases in volume to the level of the first audio signal.

28. The device of claim 22 wherein: said first signal is a first audio signal having an intermittent sound determined by the motion of the dog.

* * * * *

UNITED STATES PATENT AND TRADEMARK OFFICE
CERTIFICATE OF CORRECTION

PATENT NO. : 4,399,432
DATED : August 16, 1983
INVENTOR(S) : David J. Lunn

It is certified that error appears in the above—identified patent and that said Letters Patent are hereby corrected as shown below:

Column 1, line 7, "terrian" should be -- terrain --.

Column 5, line 33, "cicuitry" should be -- circuitry --.

Signed and Sealed this

Sixth Day of December 1983

[SEAL]

Attest:

GERALD J. MOSSINGHOFF

Attesting Officer

Commissioner of Patents and Trademarks